(12) United States Patent
Tu

(10) Patent No.: US 6,441,729 B1
(45) Date of Patent: Aug. 27, 2002

(54) GUARD DEVICE OF SEAT BELT WITH DUAL CIRCUIT IN A CAR

(76) Inventor: Shun-hsing Tu, No. 225, Sec. 2, Di-hwa St., Taipei (TW), 103

( * ) Notice: Subject to any disclaimer, the term of this patent is extended or adjusted under 35 U.S.C. 154(b) by 0 days.

(21) Appl. No.: 09/712,284

(22) Filed: Nov. 15, 2000

(51) Int. Cl.[7] .................................................. B60Q 1/00
(52) U.S. Cl. ..................................................... 340/457.1
(58) Field of Search ............................. 340/457.1, 457, 340/438; 180/268, 271; 280/801.1, 735, 732

(56) References Cited

U.S. PATENT DOCUMENTS

| | | | | |
|---|---|---|---|---|
| 3,375,495 A | * | 3/1968 | Burns | 340/457.1 |
| 6,059,066 A | * | 5/2000 | Lary | 340/457.1 |
| 6,239,695 B1 | * | 5/2001 | Okada et al. | 340/457.1 |

* cited by examiner

*Primary Examiner*—Brent A. Swarthout

(57) ABSTRACT

An automatic guard device for seatbelts in a car comprises two clasps, two elastic switches, two contact switches and a warning main unit. Each elastic switch is disposed in each clasp and connects with each contact switch by way of an AV wire. The contact switches are disposed in front of the seatbacks of the driver's and the front passenger seats respectively. Each elastic switch connects with a corresponding AV terminal on the main unit. The main unit is provided with dual circuits therein connecting with the power source of the car via the lighter socket in the car. When one of the contact switches is touched, the main unit emits a warning sound and/or flashes to remind the driver and the passenger at the front seats in the car that their seatbelts have to be fastened. Once each elastic switch is pressingly contacted by the lock piece on each seat belt, the buzzer and/or the light emitting diodes in the dual circuits ceases emitting the warning sound and/or the flashes.

6 Claims, 6 Drawing Sheets

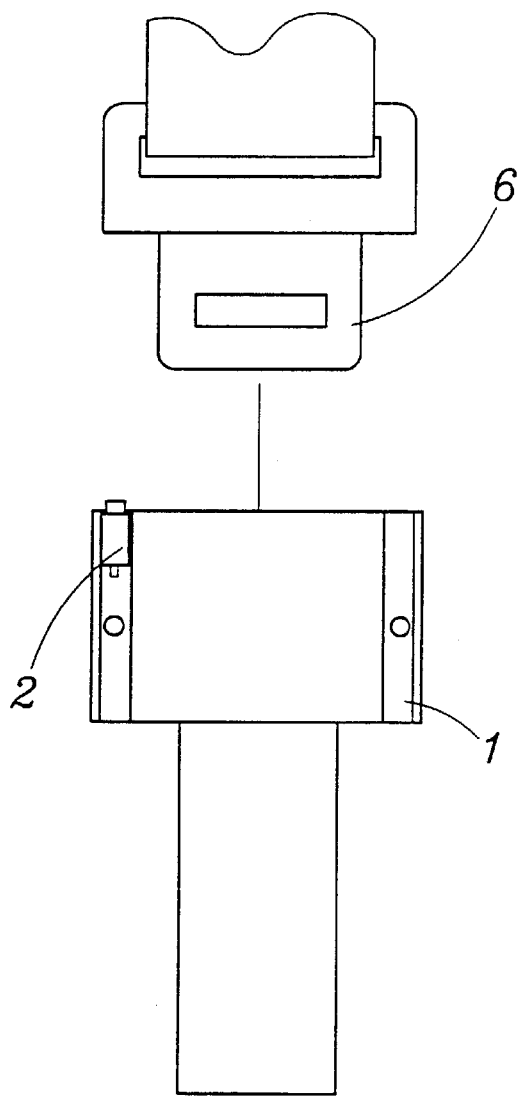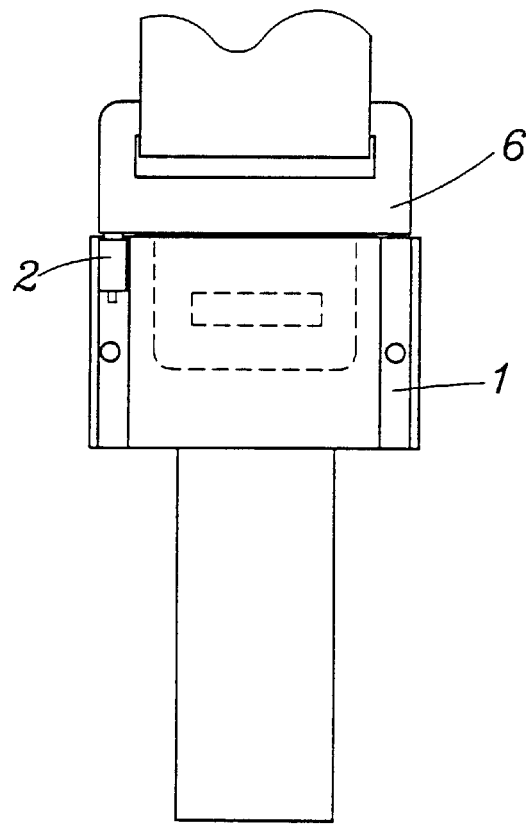
Fig 6
Fig 7

GUARD DEVICE OF SEAT BELT WITH DUAL CIRCUIT IN A CAR

BACKGROUND OF THE INVENTION

1. Field of The Invention:

The present invention relates to an automatic guard device for seatbelts in a car. In particular, the present invention relates to an automatic guard device with which the driver and the passenger at front seats in a car are warned to fasten their seatbelts.

2. Description of Related Art:

In order to remind a driver for fastening the seatbelt thereof in a car, there are a lot of guard devices have been made already. For instance, one guard device of the prior art comprises a start switch located in the slot of a clasp to engage with a lock piece on the seatbelt and the start switch controls the high voltage coil of the ignition plug in the engine. The lock piece at an end of the seatbelt has to be inserted into the slot first such that the start switch is then pressed by the lock piece to electrically connect with the high voltage coil and the engine can be started up accordingly.

It is apparent from above description of prior art that the driver has to fasten the seatbelt before the car engine is possible to be started and it provides a function to warn the driver. However, The prior art does not work for the passenger at the front seat beside the driver. Hence, the safety of the passenger at the front seat has not been considered in the prior art.

The present invention has overcome the disadvantage of the prior art and developed an automatic guard device, which is possible to warn the driver and the passenger at the front seats in a car once both of them or one of them forgets to fasten his seat belt.

SUMMARY OF THE INVENTION

An object of the present invention is to provide an automatic guard device for seatbelts in a car, which can remind the driver and the passenger at the front seats in the car to fasten the seatbelts by way of the dual circuit design. Accordingly, the safety in a car can be enhanced effectively.

Another object of the present invention is to provide an automatic guard device for seatbelts in a car, with which the only things have to be done by the driver and the passenger at the front seats are to confirm their seatbelts having been fastened:d already. Advantageously, it is not necessary for the driver and the passenger at the front seats to operate any switch.

A further object of the present invention is to provide an automatic guard device for seatbelts in a car, which has a warning main unit to emit a sound and/or flashes as soon as the driver and the passenger sit on their seats.

A further object of the present invention is to provide an automatic guard device for seatbelts in a car, which is possible to be detachably mounted in the car by way of DIY easily.

A further object of the present invention is to provide an automatic guard device for seatbelts in a car, which can remind the driver and the passenger as soon as they sit on their seats regardless how many times they get off the car.

BRIEF DESCRIPTION OF THE DRAWINGS

The detail structure, the applied principle, the function and the effectiveness of the present invention can be more fully understood with reference to the following description and accompanying drawings, in which:

FIG. 6 is a plan view illustrating the seatbelt being in a state of unfastening; and FIG. 7 is a plan view illustrating the seatbelt being in a state of fastening with a contacted elastic switch.

DETAILED DESCRIPTION OF THE PREFERRED EMBODIMENT

Figure 1:
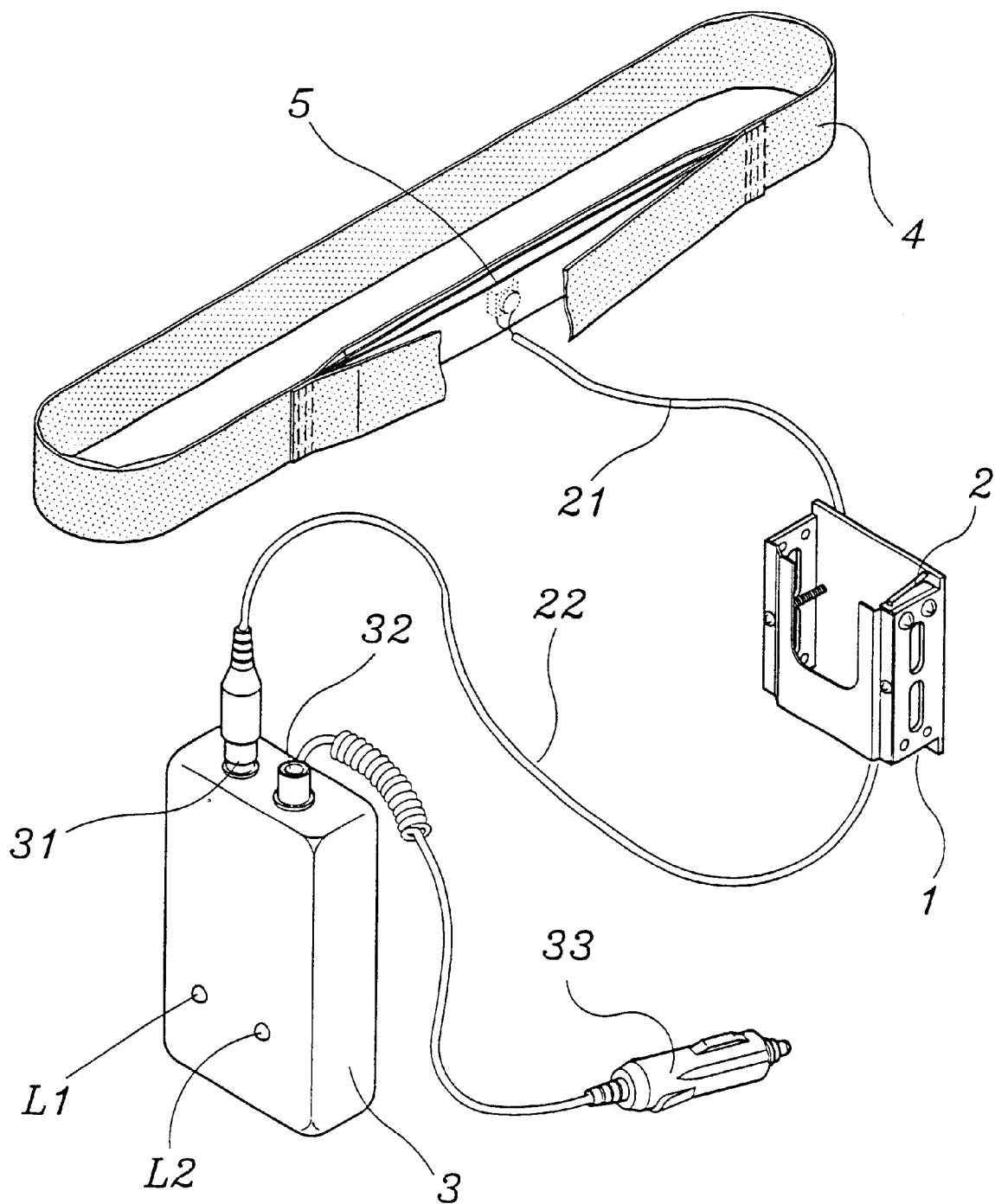
FIG. 1 is a perspective view of an automatic guard device for seatbelt in a car of the present invention.
Figure 2:
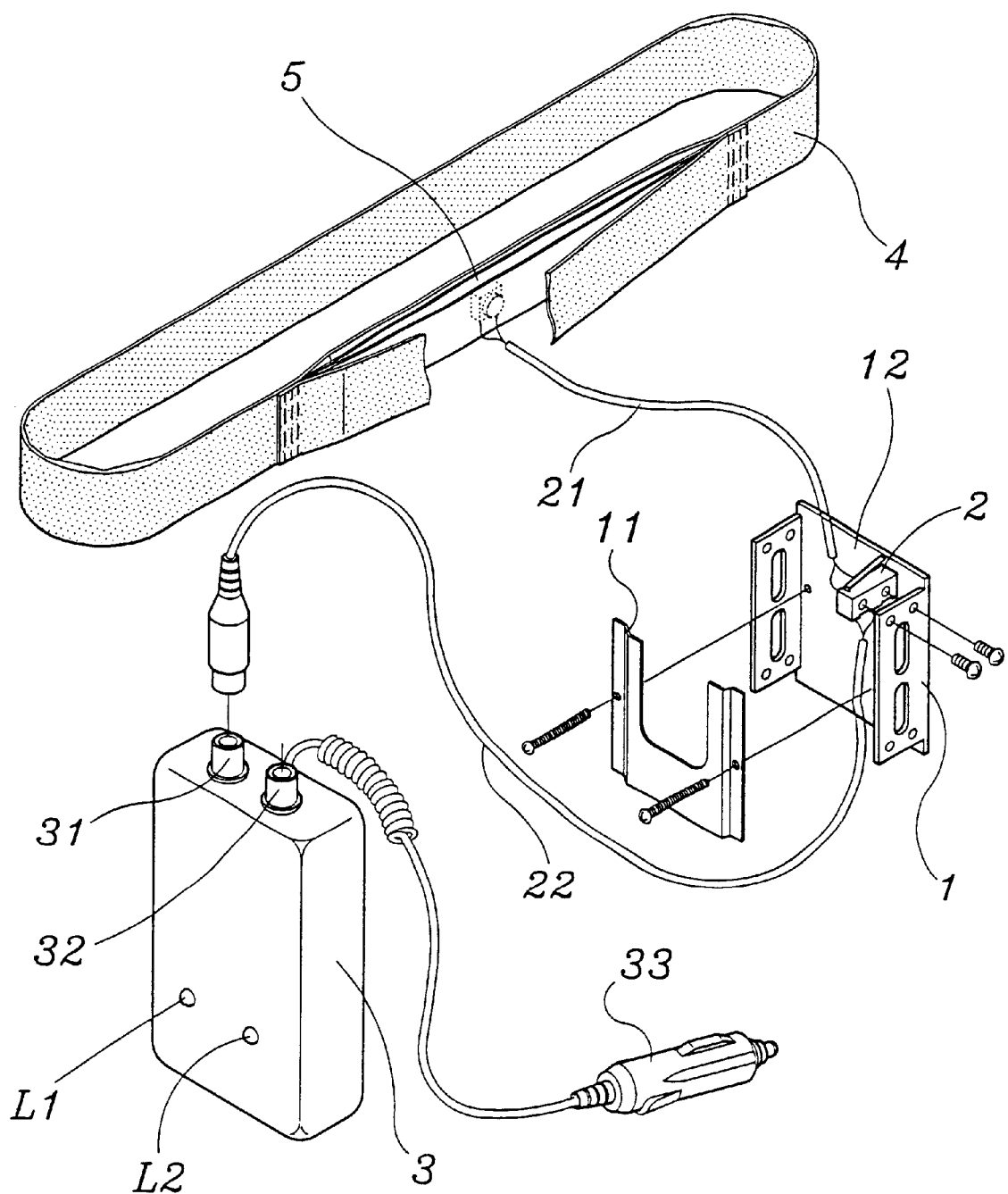
FIG. 2 is a disassembled perspective view of the automatic guard device shown in FIG. 1.

Referring to FIGS. 1 and 2, an automatic guard device for seatbelts in a car according to the present invention comprises two clasps 1, two elastic switches 2, a warning main unit 3, two circular belts 4 and two contact switches 5.

Figure 3:
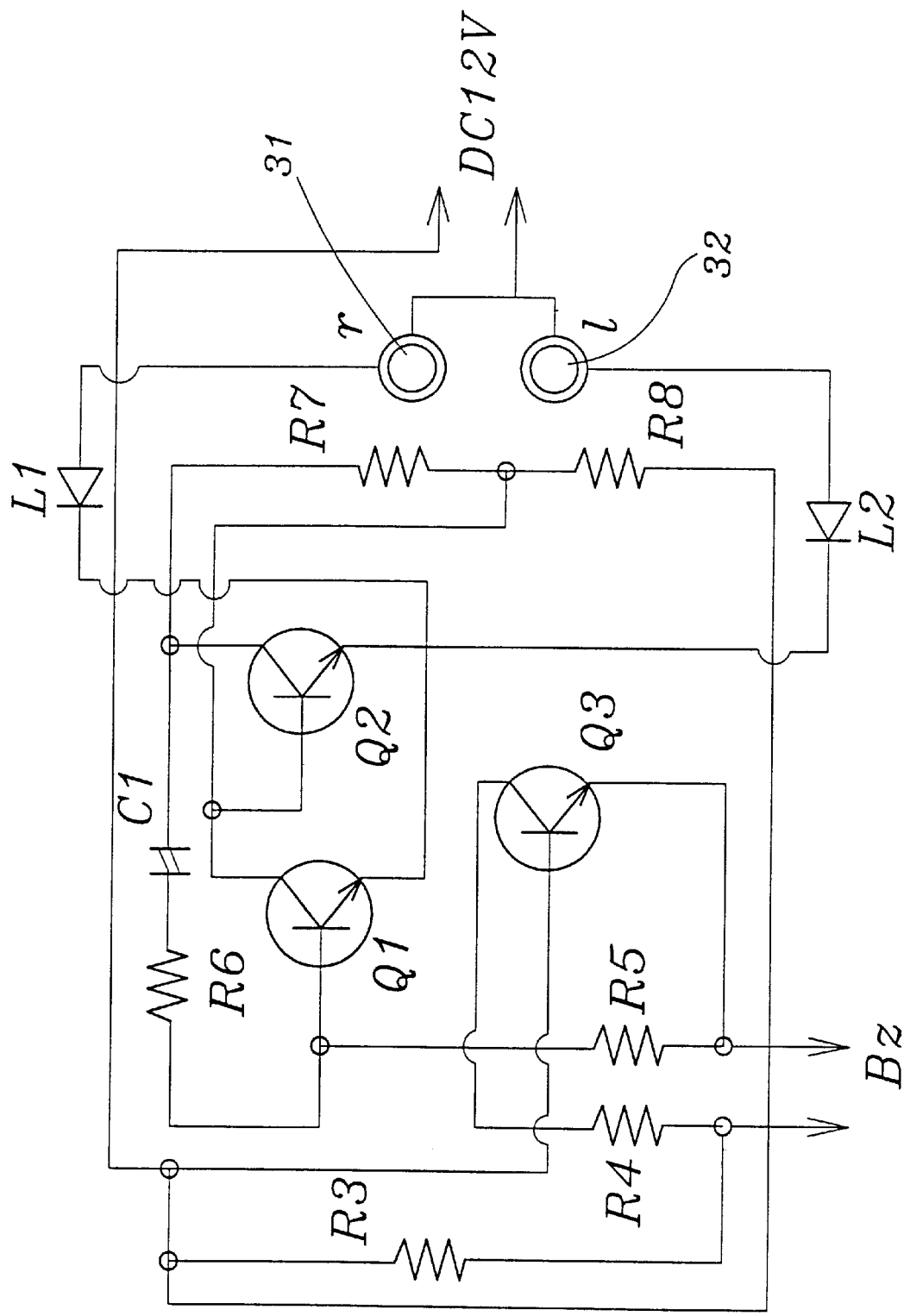
FIG. 3 is a circuit diagram of dual circuits in a warning main unit of the automatic guard device shown in FIG. 1.

Each clasp 1 is hollow and composed of a cover plate 11 made of fiber reinforced plastics and a base frame 12 made of fiber reinforced plastics. The cover plate 11 engages with the base frame 12 by way of fasteners. The base frame 12 at the inner side thereof is attached with one of said elastic switches 2. Each elastic switch 2 is in a state of on while a lock piece 6 on a seatbelt is not inserted into each clasp 1 as shown in FIG. 6. Contrarily, each elastic switch 2 is in a state of off while the lock piece 6 is inserted into the clasp 1 and contacts the elastic switch 2 therein as shown in FIG. 7. The respective elastic switch 2 connects with a contact switch 5 by way of an AV (audio-video) signal wire 21 and the contact switch 5 is set in each flexible belt 4 to constitute a seat back type switch. The elastic switch 2 shown in FIGS. 1 and 2 further connects with an AV terminal: 31 on the main unit 3 by way of another AV wire 22. Similarly, the other elastic switch 2, which is not shown in FIGS. 1 and 2, is connected to another AV terminal 31 on the main unit 3 (not shown) with a further AV wire. A power source terminal 32 is provided on the main unit 3 beside the AV terminal 31. The AV terminal 31 and the socket terminal 32 connect with dual circuits in the main unit 3 respectively. The working power of the dual circuits can be supplied by the D.C. (direct current) power source of the car via the lighter socket in the car being connected to an electric plug 33. The dual circuits are composed of transistors Q1, Q2, Q3, resistors R1 to R8, a capacitor C1, a buzzer Bz, light emitting diodes L1, L2 as shown in FIG. 3. Because these components are prior art, no detail will be described further.

When the contact switch 5 is pressed, the buzzer Bz in the main unit 3 emits a warning sound and/or the light emitting diodes L1, L2 in the main unit 3 emit flashes. Thus, the driver and the passenger at the front seats in the car may be informed to insert the respective lock piece 6 into the respective clasp 1. In this way, the elastic switch 2 in the respective clasp 1 is pressed by the inserted corresponding lock piece 6 to turn off the warning sound and/or the flash of light emitting diodes L1, L2 on the dual circuit main unit 3.

Figure 4:
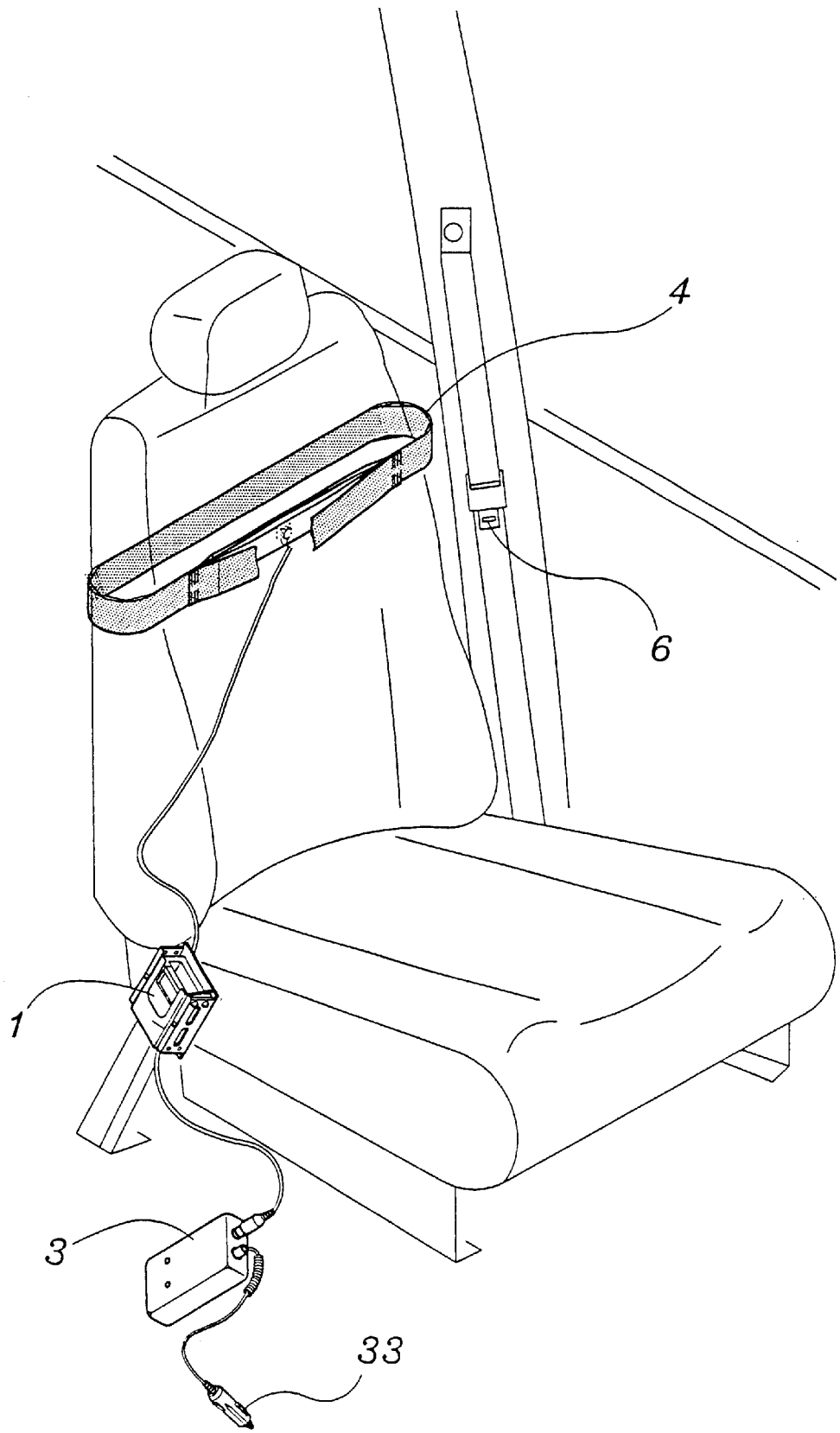
FIG. 4 is a perspective view illustrating one of the circular belts in an automatic guard device according to the present invention being disposed to enclose the driver's seatback.
Figure 5:
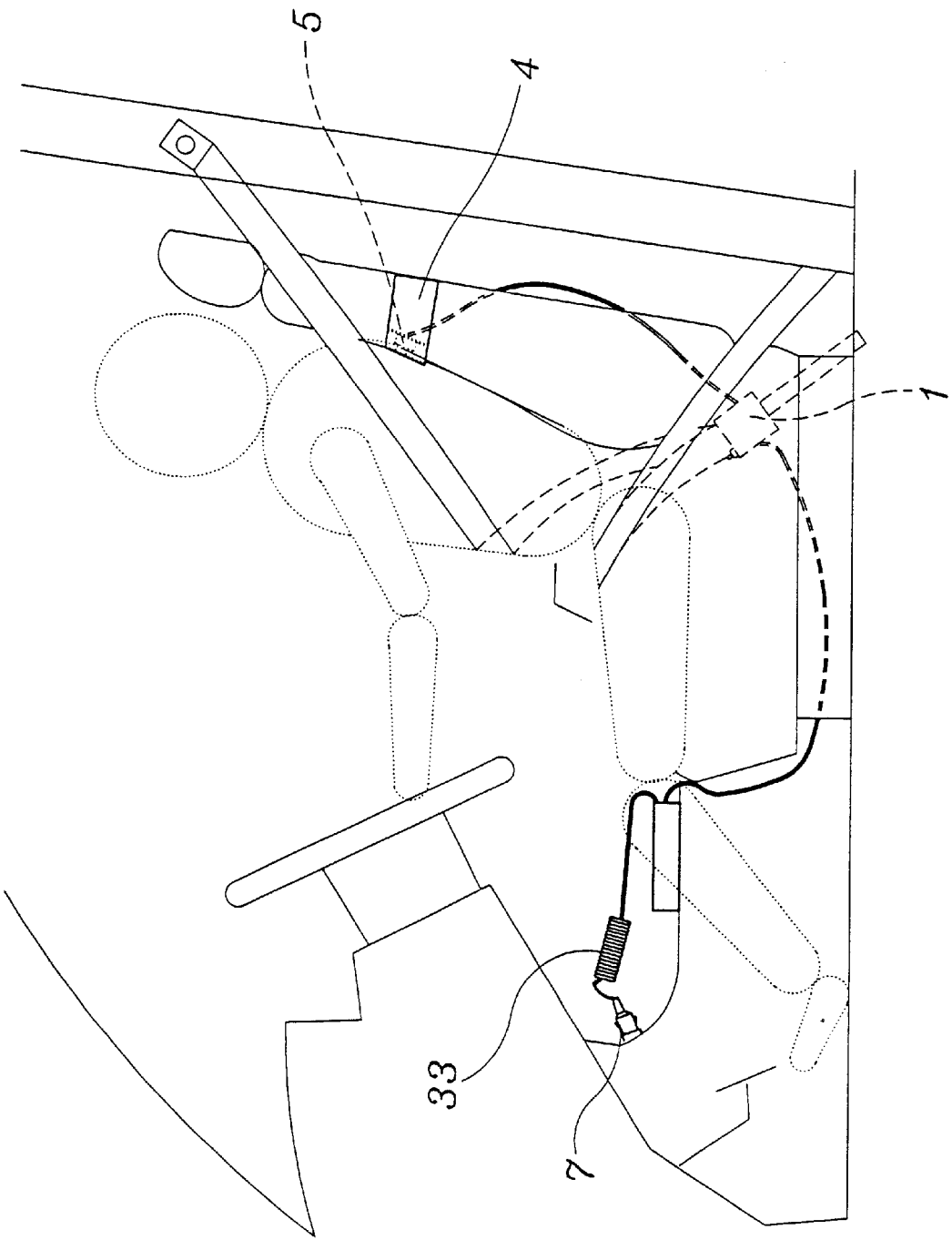
FIG. 5 is a side view of FIG. 4 illustrating the automatic guard device being in a state of use with an electric plug being inserted into the lighter socket in the car.

Referring to FIGS. 4 and 5, it can be seen that one of flexible belts 4 has been mounted on the back of driver's seat to make the contact switch 5 face the back of the driver. The other flexible belt 4 is mounted on the back of the front passenger (not shown). Also, the electric plug 33 connected to the power source terminal 32 has been inserted into the lighter socket 7.

When the back of the driver or the passenger presses the contact switch 5 on the respective flexible belt 4, it results in the contact switch 5 being in a state of on. Thus, the buzzer Bz in the main unit 3 keeps on emitting a sound with a set frequency and/or the light emitting diodes L1, L2 emit flashes to remind the driver and/or the front seat passenger that his seatbelt has to be fastened. When the respective lock piece 6 is inserted into the respective clasp 1, the elastic switch 2 is in a state of off while it contacts with the lock piece 6. At this time, the buzzer Bz and the light emitting diodes L1, L2 cease emitting the sound and the flashes respectively.

It is appreciated that the present invention has a function to remind the driver and the passenger at the front seats in a car once their seatbelts are not fastened even if the driver or the passenger gets off and gets into the car more times. Moreover, it is easy for a user to detachably set up the guard device of the present invention in the car. Therefore, advantages of the present invention are not possible for the prior art to reach effectively.

While the invention has been described with referencing to a preferred embodiment thereof, it is to be understood that modifications or variations may be easily made without departing from the spirit of this invention, which is defined by the appended claims.

What is claimed is:

1. An automatic guard device for seat belts in a car, comprising:

two clasps, being disposed at a lateral side of the driver's seat and a lateral side of the front passenger seat in the car respectively;

two elastic switches, being corresponding to the clasps and being disposed in the clasps respectively;

two circular flexible belts, being attached to the driver's seat and the front passenger seat in the respectively;

two contact switches, being attached to the circular flexible belts respectively; and a warning main unit, being connected to the elastic switches and to a D.C. power source in the car respectively;

characterized in that the flexible belts are arranged to enclose the driver's seat and the front passenger seat at their seatbacks respectively and the contact switches are disposed in front of the seatbacks respectively to electrically connect with the elastic switches respectively and are in a state "off" before being touched; the main unit further comprises two AV terminals, a power source terminal and a set of dual circuits, wherein the AV terminals and the power source terminal are electrically connected to the dual circuits and the AV terminals are electrically connected to the elastic switches and the power source terminal is electrically connected to the D.C. power source via a lighter socket in the car; the dual circuits further comprises a buzzer and two light emitting diodes; and the elastic switches are in a state of "on" respectively before being contacted;

wherein, once the driver and the front seat passenger get into the car and sit on their seats and as long as at least one of the contact switches is touched by either the back of the driver or the back of the passenger to become in a state of "on", the buzzer and the light emitting diodes are capable of emitting a warning sound and flashes respectively to remind the driver and the passenger that the seatbelts thereof have to be fastened; once both of the driver and the passenger fasten their seatbelts and the elastic switches are pressingly contacted, the elastic switches become in a state of "off" and the buzzer and the light emitting diodes cease emitting the sound and the flashes.

2. The automatic guard device for seatbelts in a car as defined in claim 1, wherein the dual circuits in the main unit can be arranged to allow the buzzer emitting the warning sound only.

3. The automatic guard device for seatbelts in a car as defined in claim 1, wherein the dual circuits in the main unit can be arranged to allow the light emitting diodes emitting the flashes only.

4. The automatic guard device for seatbelts in a car as defined in claim 1, wherein the buzzer and the light emitting diodes cease emitting the sound and the flashes respectively in case of the seatbelt at the driver's seat is fastened only and the front passenger seat is vacant.

5. The automatic guard device for seatbelts in a car as defined in claim 2, wherein the buzzer ceases emitting the sound in case of the seatbelt at the driver's seat is fastened only and the front passenger seat is vacant.

6. The automatic guard device for seatbelts in a car as defined in claim 3, wherein the light emitting diodes cease emitting the flashes in case of the seatbelt at the driver's seat is fastened only and the front passenger seat is vacant.

\* \* \* \* \*